United States Patent [19]

Ishikawa et al.

[11] Patent Number: 4,947,261

[45] Date of Patent: Aug. 7, 1990

[54] PORTABLE IMAGE INPUT DEVICE

[75] Inventors: Toshio Ishikawa, Nara; Yukio Kurata, Tenri, both of Japan

[73] Assignee: Sharp Kabushiki Kaisha, Osaka, Japan

[21] Appl. No.: 216,268

[22] Filed: Jul. 7, 1988

[30] Foreign Application Priority Data

| Jul. 8, 1987 | [JP] | Japan | 62-170118 |
| Jul. 18, 1987 | [JP] | Japan | 62-179711 |
| Jul. 18, 1987 | [JP] | Japan | 62-179712 |

[51] Int. Cl.$^5$ ............................................. H04N 1/21
[52] U.S. Cl. ................................. 358/473; 358/471; 358/474; 382/59
[58] Field of Search ............... 358/285, 474, 293, 494, 358/294, 471, 286, 476, 472, 473, 475; 382/59; 235/472; 250/227; 364/709.1, 708, 403, 405; 346/76 PH

[56] References Cited

U.S. PATENT DOCUMENTS

| 4,314,283 | 2/1982 | Kramer | 358/293 |
| 4,489,351 | 12/1984 | d'Alayer de Costemore d'Arc | 358/906 |
| 4,538,060 | 8/1985 | Sakai et al. | 235/472 |
| 4,602,293 | 7/1986 | Sekine | 358/294 |
| 4,701,804 | 10/1987 | Toyoda et al. | 358/285 |
| 4,704,519 | 11/1987 | Sulikauskas | 235/472 |
| 4,707,747 | 11/1987 | Rockwell, III | 358/293 |
| 4,716,291 | 12/1987 | Sakamoto et al. | 382/59 |
| 4,722,065 | 1/1988 | Ogawa | 364/709.1 |
| 4,731,668 | 3/1988 | Satomura et al. | 358/256 |
| 4,739,159 | 4/1988 | Inokuchi | 250/578 |
| 4,742,369 | 5/1988 | Ishii et al. | 358/906 |
| 4,785,357 | 11/1988 | Dreyfus et al. | 358/293 |
| 4,792,859 | 12/1988 | Wicker et al. | 358/293 |
| 4,802,014 | 1/1989 | Koga | 358/471 |
| 4,816,661 | 3/1989 | Krichever et al. | 235/472 |
| 4,827,347 | 5/1989 | Bell | 358/210 |
| 4,866,258 | 9/1989 | Meda et al. | 235/472 |
| 4,868,676 | 9/1989 | Matsumura | 358/474 |

FOREIGN PATENT DOCUMENTS

| 60-218179 | 4/1984 | Japan . |
| 61-224081 | 10/1986 | Japan . |
| 61-224082 | 10/1986 | Japan . |
| 61-262887 | 11/1986 | Japan . |
| 62-5292 | 1/1987 | Japan . |

*Primary Examiner*—James J. Groody
*Assistant Examiner*—Kim Yen Vu

[57] ABSTRACT

An image input device of a portable type includes a light source for reading an original document, a photoelectric converting element for converting reflected light from the original document into an electrical signal, a memory function section having a solid state memory element for storing the output of the photoelectric converting element, an output port for allowing external connections, and operating keys for operating the image input device. Furthermore, the image input device may include a diffraction grating for diffracting the reflected light to form an image on the photo-electric converting element and interchangeable lenses having different focal lengths for achieving various magnifications.

14 Claims, 5 Drawing Sheets

PORTABLE IMAGE INPUT DEVICE

BACKGROUND OF THE INVENTION

The present invention generally relates to an image reading arrangement, and more particularly, to an image input device for reading images (including characters) of an original document or the like.

Conventionally, the image input device has been generally of a large scale in construction requiring a beam scanning mechanism, an original document feeding mechanism, etc. as represented by an image scanner, facsimile equipment or the like, thus making it difficult to be portable. Meanwhile, with the development of an information oriented society, a simple and convenient information collecting means is desired, and as one example which has realized such a desire is the portable type copying machine now commercially available.

Although the image input device for the portable type copying machine is compact in size and capable of manually scanning over an original document, since the read image information is arranged to be immediately used for copying, it is impossible to adopt a practice for effecting input and copying of the image information at different time periods, and furthermore, the input image information is mostly used only for copying, and can not be applied to such uses as projection onto a CRT display.

SUMMARY OF THE INVENTION

Accordingly, an essential objective of the present invention is to provide an improved image input device of a portable type, which is compact in size and light in weight for convenience in handling and arranged to retain input information so that this information can be outputted at any time depending on necessity.

Another objective of the present invention is to provide an image input device of the above described type, which has a simple construction, functions, with stability and can be readily manufactured at low cost.

In accomplishing these and other objectives, according to one preferred embodiment of the present invention, there is provided a portable image input device which includes a light source for reading an original document, a photo-electric converting element for converting reflected light from the original document into an electrical signal, a memory function section having a solid state memory element for storing output of the photo-electric converting element, an output port for external connection, and operating keys for operating the image input device.

In the present invention, as described above, when the operating key, for example, for input is depressed, the light source is illuminated to establish a reading state and for original document. The image information is read during the scanning of the original document by manually moving the image input device over the original document. The read information is outputted from the photo-electric converting element so as to be successively stored in the solid state memory element.

Subsequently, for outputting the stored information a device, such as a printer, CRT display, facsimile equipment, or the like, is connected to the output port, and upon depression of the operating key for output, the image information is transmitted to such a device.

In another aspect of the present invention, there is provide a portable image input device of a portable type, which includes a light source, a photo-electric converting element, an image forming lens, a diffraction grating device for leading light emitted by the light source and reflected by an information medium, towards the said photo-electric converting element, a memory function section having a solid state memory element for storing output of the photo-electric converting element, an output port for external connection, and operating keys for operating the image input device.

In the above construction, however, it is preferable to add a lens to the diffraction grating device. Furthermore, it is also desirable to hermetically seal the light source and the photo-electric converting element within the same cap or housing, and particularly, to use the diffraction grating device in conjunction with the hermetic sealing.

In the present invention, according to the above described construction, upon depression of the operating key, for example, for input, the light source is lit to establish a reading state for reading an information medium, i.e., original document. In this case, light emitted by the light source is imparted to the information medium through the diffraction grating device and the image forming lines the light reflected from the medium therefrom is led to the photo-electric converting element located in a position different from that of the light source through the image forming lens and the diffraction grating. The image information read by scanning the information medium through manual movement of the image input device over the information medium. The read information is outputted from the photo-electric converting element so as to be successively stored in the solid state memory element, and thus, the image information is stored by the device.

For outputting the stored information, to with a device, such as a printer, CRT display, facsimile equipment or the like which is connected to the output port, the image information is transmitted to such external equipment by depressing the operation key for output.

In a further aspect of the present invention, there is also provided a portable image input device which includes a light source, a photo-electric converting element, an image forming optical system for collecting light emitted by the light source, onto an information medium and, for directing reflected light from the medium onto the photo-electric converting element a memory function section having a solid state memory element for storing output of the photo-electric converting element, an output port for external connection, and operating keys for operating the image input device the image forming optical system is provided with a portion capable of interchanging lenses by attaching and detaching.

According to the above arrangement of the present invention, upon depression of the operating key, for example, for input, the light source is lit to establish a reading state for reading an information medium, i.e., original document. In this case, light emitted by the light source is imparted to the information medium in a converged form by the image forming optical system, and the reflected light is led to the photo-electric converting element through the image forming optical system. The image information read by scanning the information medium through manual movement of the image input device is outputted from the photo-electric converting element so as to be successively stored in the solid state memory element, and thus, the image information is stored in the device.

Since the optical system is arranged to be capable of interchanging the lenses through attaching or detaching, it is possible to alter the size of light converging on the information medium, and the image forming magnification for the photo-electric converting element this, consequently, enables enlargement or contraction of the input image.

For outputting the stored information to a device, such as a printer, CRT display, facsimile equipment or the like, which is connected to the output port, the image information is transmitted to such external equipment in the manner similar to that described above.

BRIEF DESCRIPTION OF THE DRAWINGS

These and other objectives and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
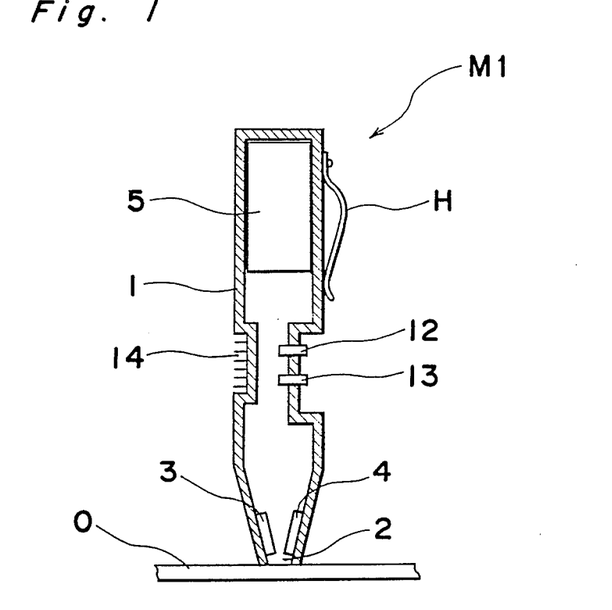
FIG. 1 is a schematic longitudinal sectional view of an image input device according to one preferred embodiment of the present invention.

Referring now to the drawings, FIG. 1 shows an image input device M1 according to one preferred embodiment of the present invention, which generally includes a casing 1 of a cylindrical pen-like shape made, for example, of a synthetic resin and having an opening 2 at its convergent tip; a light source 3; a photo-electric converting element 4 provided within the casing 1 in positions adjacent to the opening 2; a memory function section 5 provided at the upper portion of the casing 1; an input operating key 12 and an output operating key 13 disposed at an intermediate portion of the casing 1; an output port 14 for connection with external appliances; and a resilient stopper or clip H connected at its one end to the upper outer surface of the casing 1 for retaining the image input device M1 when it is carried in a pocket of a suit, etc.

Figure 2:
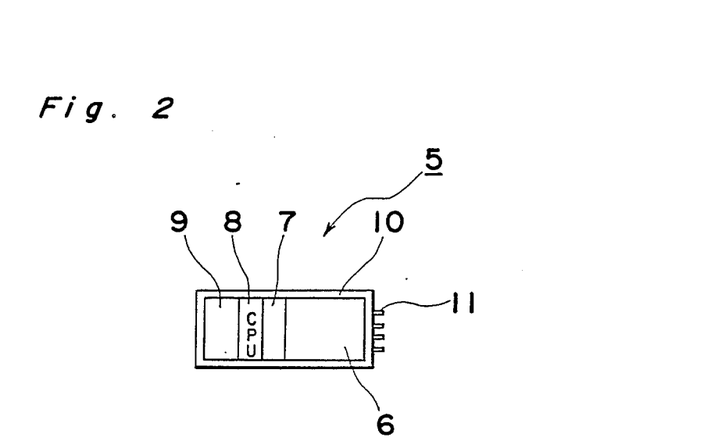
FIG. 2 is a schematic side sectional view showing, on an enlarged scale, a memory function section employed in the image input device of FIG. 1.

The photo-electric converting element 4 of a CCD (charge coupled device) having a plurality of independent light receiving regions or photodiode arrays, etc., although not particularly shown. As shown in FIG. 2, the memory function section 5 further includes a solid memory element 6 composed of a RAM (random access memory), a memory refresh circuit 7, a CPU (central processing unit) 8, and a power source 9 which are accommodated in a container 10 having connecting pins 11 extending outwardly.

Figure 3:
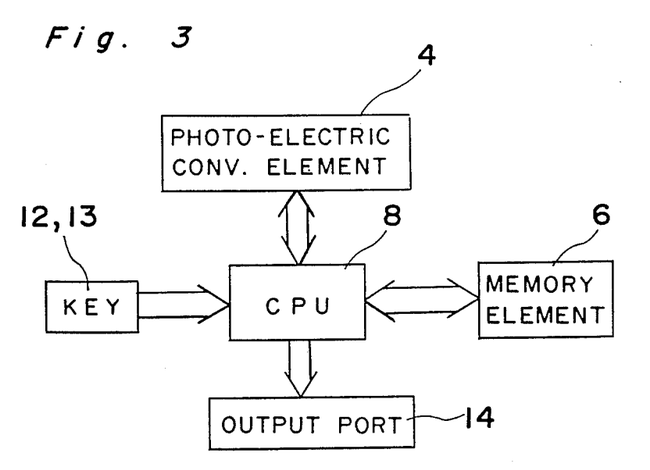
FIG. 3 is an electrical block diagram showing general construction of the image input device of FIG. 1.

FIG. 3 shows a block diagram for an electrical circuit construction according to the arrangement of FIGS. 1 and 2, described above, in which the photo-electric converting element 4, the memory element 6, and the operating keys 12 and 13 are coupled with the CPU 8 which is connected to the output port 14 as shown.

When the image input device M1 is placed on the original document or information medium O as shown in FIG. 1, the device M1 is slid in one direction, with the input operating key 12 depressed causing light to be emitted by the light source 3 through the opening 2. The light is reflected by the original document O and is incident upon the photo-electric converting element 4 which converts the information into an electrical signal. This electrical signal is applied to the CPU 8 through a signal line (not shown). The CPU 8 converts the output signal of the photo-electric converting element 4 into a digital value and causes the converted data to be stored in the solid state memory element 6.

For outputting the stored image information, to an external appliance (not shown) which is connected to the output port 14, the image information successively read out from the solid state memory element 6 is transmitted to the external appliance through the output port by depressing the output operator key 13. The external appliance, a printer, CRT display, facsimile equipment or the like, can be connected to the image input device M1.

Figure 4:
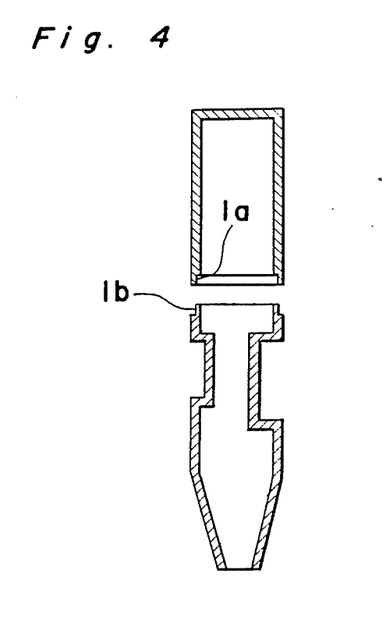
FIG. 4 is a schematic longitudinal sectional view showing one construction of a casing to be employed in the image input device of FIG. 1.

In the above embodiment, since the memory refresh circuit 7, the CPU 8, the solid state memory element 6 and the power source 9 are integrally formed as a memory function section 5, the memory retaining function may be continuously maintained, even when the memory function section 5 is taken from the image input device M1. Accordingly, by exchanging the memory function section 5 as a cartridge, the device M1 can be used in various applications without being restricted by the memory capacity. To make the memory function section 5 exchangeable as described above, it may be, for example, arranged so that the casing 1 is divided into upper and lower portions, respectively, and provided with fitting means 1a and 1b at corresponding edges, as shown in FIG. 4, for engagement or disengagement of the portions. It is to be noted here that the above embodiment may, for example, be modified so that, apart from the power source 9 within the memory function section 5, another power source (not shown) can also be provided in the casing 1.

As is seen from the foregoing description, the first embodiment of the present invention, it is very convenient, because the image input is memorized when necessary by carrying about only the image input device, and the memorized information may be outputted as required, from the device that is formed compact in size and light in weight. Furthermore, since the external appliance is not limited to one kind of a specific use, the output of the device may be directed to various applications.

Figure 5:
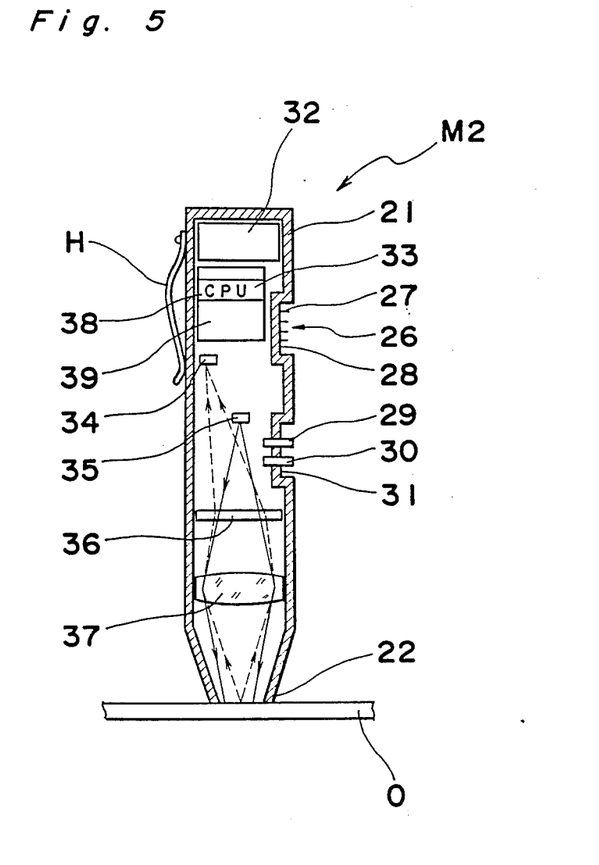
FIG. 5 is a view similar to FIG. 1, which particularly shows a second embodiment of the present invention.

Referring also to FIG. 5, there is shown an image input device M2 according to a second embodiment of the present invention.

The image input device M2 also includes a casing 21 made of a cylindrical shape, for example, of a synthetic resin with an opening 22 at the convergent forward end thereof, which is slid over an information medium or an original document O during input of an image information. A resilient stopper or clip H is fixed at one end to the upper outer face of the casing 21, an output port 26 has connecting pins 27 for an external connection, and is provided in a first recess 28 formed at the upper portion of the casing 21 to receive a connector (not shown) for connections with an external appliances to achieve a stable electrical coupling therewith, and input and output operating keys 29 and 30 are provided in a second recess 31 formed on the casing 21 at a position below the first recess 28.

Within the casing 21, there are disposed a power source 32, a memory function section 33, a photo-electric converting element 34, a light source 35, a diffraction grating 36 and an image forming lens 37, etc. in that order from the upper portion of the casing 21. The memory function section 33 includes a solid state memory element 39 such as a RAM (random access memory) or the like, and a CPU 38, etc. The photo-electric converting element 34 is composed of a CCD having a plurality of independent light receiving regions or photo-diode arrays as in the first embodiment. The light source 35 may be constructed by a semiconductor laser and the like.

Since the electrical circuit construction of the image input device M2 of FIG. 5 is generally the same as in the first embodiment (FIG. 3), a detailed description thereof is abbreviated here.

In FIG. 5, zero order light (non-diffracted light) from the diffraction grating 36 for the light emitted from the light source 35, is converged into a predetermined size onto the information medium O through the image forming lens 37 so as to irradiate the reading region on the information medium O. The light reflected therefrom is converged by the image forming lens 37, and thereafter, is diffracted by the diffraction grating 36, to form an image on the photo-electric converting element 34.

Now, in the state where the image input device M2 is placed on the information medium O as shown in FIG. 5, when the device M2 is slid in one direction, with the input operating key 29 depressed, the image information in a light form is led to the photo-electric converting element 34 as described above and is converted into an electrical signal by the converting element 34 so as to be applied to the CPU 38 through a signal line (not shown). The CPU 38 converts the output signal of the photo-electric converting element 34 into a digital value. Also, converted data is stored in the solid state memory element 39, and thus, the inputted image information is memorized and retained.

For outputting of the memorized image information, upon depression of the output operating key 30, with an external appliance (not shown) being connected to the output port 26, the image information successively read out from the solid state memory element 39 is transmitted to the external appliance through the output port 26. An external appliance, a printer, CRT display, facsimile equipment or the like may be connected to the image input device M2 as in the first embodiment described earlier.

In the arrangement of FIG. 5, the light source 35 and the point on the information medium O are not in a conjugate relation. On the other hand, owing to the necessity for forming the image information from the information medium O, on the photo-electric converting element 34, it is required that the point on the information medium O and the light receiving surface of the photo-electric converting element 34 should naturally be in a conjugate relation. The light source 35 and the photo-electric converting element 34 must be disposed in different positions with respect to the direction of the optical axis. However, this arrangement undesirably complicates the construction of the casing 21, thus being disadvantageous for forming compact size of the casing 1.

Figure 6:
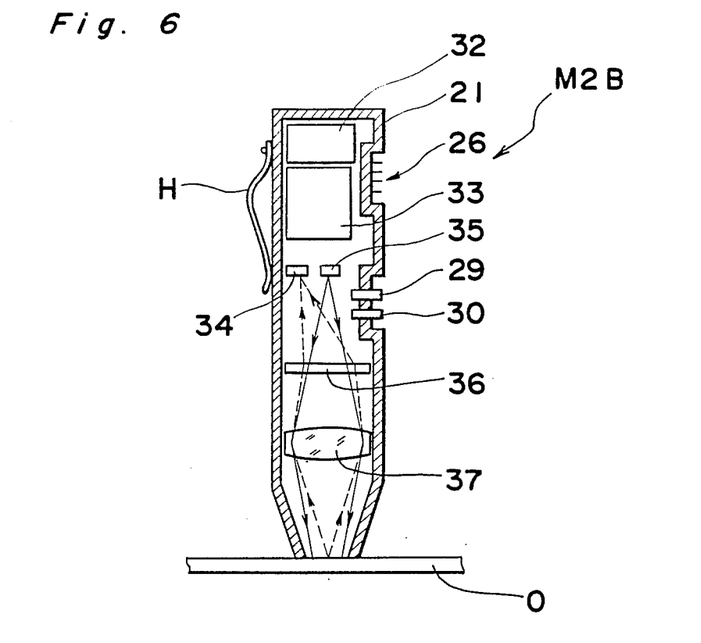
FIG. 6 is also a view similar to FIG. 5, which particularly shows a further embodiment of the present invention.

Accordingly, in a modified image input device M2B as shown in FIG. 6, by imparting a lens effect (power) to the diffraction grating 36, the light source 35 and the photo-electric converting element 34 are arranged to be disposed at the same position with respect to the direction of the optical axis. By such an arrangement as described above, not only is the casing structure simplified, and a compact size of the image input device achieved, but also, the light source 35 and the photo-electric converting element 34 can be mounted within one housing as shown in FIG. 7.

As described earlier, semiconductor devices are normally employed for the light source 35 and the photo-electric converting element 34. Because the characteristics of such semiconductor devices deteriorate due to influence of the atmosphere such as moisture, oxygen, etc., hermetic sealing is required therefor. However, in a construction in which the light source 35 and the photo-electric converting element 34 are considerably deviated in positions with respect to the direction of the optical axis as shown in FIG. 5, the light source 35 and the photo-electric converting element 34 must be sealed separately. In the arrangement of FIG. 6, because the light source 35 and the photo-electric converting element 34 are located at the same position with respect to the optical axis direction, they may be accommodated in one hermetically sealed housing as shown in FIG. 7.

Figure 7:
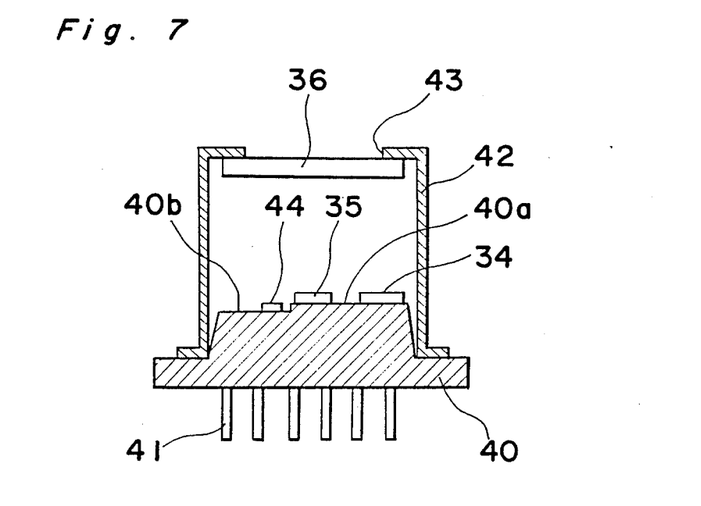
FIG. 7 is a cross section showing part of the arrangement of FIG. 6 on an enlarged scale.

In the arrangement of FIG. 7, the housing includes a stem 40 having terminal pins 41 extending downward therefrom, a cap 42 mounted on the stem 40 and having an opening 43 formed at an upper portion, and the diffraction grating 36 being attached to the cap 42 so as to close the opening 43. The light source 35 and the photo-electric converting element 34 are disposed side by side on a flat surface 40a of the stem 40, while an optical detector 44 for monitoring, which outputs a correction signal for making the light amount constant by directly receiving light of the light source 35, is provided on a stepped portion 40b lower in height than the flat surface 40a of the stem 40 by one step.

In FIG. 7, although there is shown an example in which the diffraction grating is employed as a window for a simplification in for hermetically sealing the device, the diffraction grating may be replaced by an ordinary glass plate, with the diffraction grating 36 being provided at the inner side or outer side of the sealing.

It is to be noted that the arrangement in FIG. 5 may be modified so that the photo-electric converting element 34 is disposed on the optical axis, and the light source 35 is provided outside the optical axis, with respective positions thereof in the direction of the optical axis for maintaining the image forming lens 37.

Meanwhile, in the arrangement of FIG. 6, the positions of the light source 35 and the photo-electric element 34 may be exchanged with each other, and by imparting a light diffusing effect to the diffraction grating 36, a similar effect may be obtained.

As is also referred to earlier, by arranging the memory function section 33 in the form of a replaceable cartridge, it is possible to cause the image input device to correspond to various applications without restriction by the memory capacity. For allowing the memory function section to be replaceable as referred to above, the casing 21 may, for example, be divided into upper and lower portions, with fitting means being provided thereon for selective engagement or disengagement therebetween.

According to the second embodiment of the present invention, the image input is conveniently memorized when necessary by carrying about only the image input device, and the memorized information may be outputted as required, while the device can be formed of a compact size and of a light weight. Moreover, since the external appliance is not limited to a specific use, the output of the device may be directed to various applications as in the first embodiment.

Figure 8:
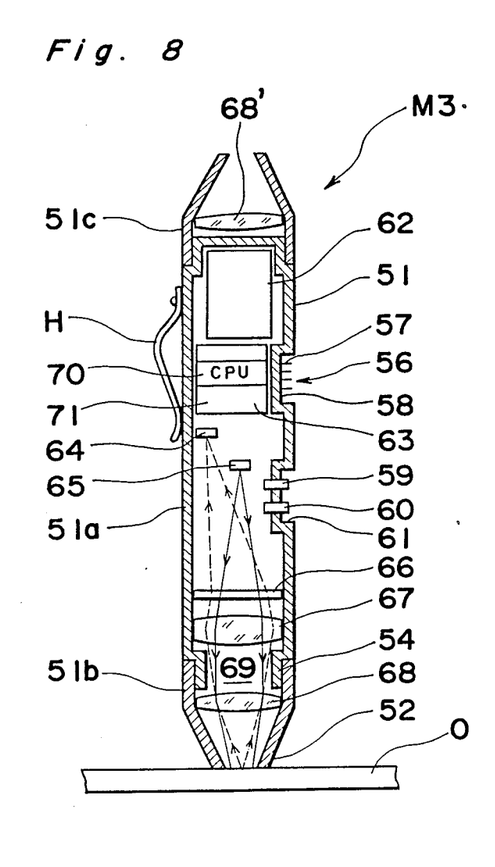
FIG. 8 is a view similar to FIG. 1,. which particularly shows a third embodiment of the present invention.

Referring further to FIG. 8, there is shown an image input device M3 according to a third embodiment of the present invention.

The image input device M3 similarly includes a casing 51 made of a cylindrical shape for example, of a synthetic resin having an opening 52 at the convergent forward end thereof which is slid over an information medium or original document O during input of image information. The casing 51 is composed of a main body portion 51a and a forward end portion 51b which is detachably mounted onto the main body portion 51a for exchanging through a fitting construction 54, and a detachable spare forward end portion 51c for replacement on the other end (i.e., the upper end in FIG. 8) of the casing 51. A resilient stopper or clip H is fixed at one end to an upper outer face of the casing 51, an output port 56 has connecting pins 57 for external connection, provided in a first recess 58 formed at the upper portion of the casing 51 to receive a connector not shown) for connection with external appliances to achieve a stable electric coupling therewith. Input output operating keys 59 and 60 are provided in a second recess 61 formed on the casing 51 at a position below the first recess 58.

Within the casing 51, there are disposed a power source 62, a memory function section 63, a photo-electric converting element 64, a light source 65, a diffraction grating 66 and a first condenser lens 67 and a second condenser lens 68, etc., in that order from the upper portion of the casing 51. The memory function section 63 includes a solid state memory element 71 such as a RAM (random access memory) or the like, and a CPU 70, etc. The photo-electric converting element 64 is composed of a CCD having a plurality of independent light receiving regions or photo-diode arrays as in the previous embodiments. The light source 65 may be constructed by a semiconductor laser and the like.

The diffraction grating 66, and the first and second condenser lenses 67 and 68 constitute the image forming optical system 69 for converging light emitted from the light source 65 onto the information medium O and also, for leading the reflected light to the photo-electric converting element 64 to form the image. In the optical system, the second condenser lens 68 is mounted at the forward end portion 51b of the casing 51 as referred to earlier. Accordingly, by replacing this forward end portion 51b with the spare forward end portion 51c, the second condenser lens 68 may be replaced by another second condenser lens 68' having a different focal length.

Because the electric circuit construction of the image input device M3 of FIG. 8 is the same as in the first embodiment (FIG. 3), a detailed description thereof is abbreviated here.

In FIG. 8, zero order light (non-diffracted light) from the diffraction grating 66 for the light emitted from the light source 65, is converged into a predetermined size onto the information medium O through the first and second condenser lenses 67 and 68 so as to irradiate the reading region on the information medium O. The light reflected therefrom is converged by the first and second condenser lenses 68 and 67. Thereafter, if the light is diffracted by the diffraction grating 66, an image on the photo-electric converting element 64 is formed.

Now, in the state where the image input device M3 is placed on the information medium O as shown in FIG. 8, when the device M3 is slid in one direction, with the input operating key 59 depressed, the image information in a light form led to the photo-electric converting element 64 as described above is converted into an electrical signal by the converting element 64 so as to be applied to the CPU 70 through a signal line (not shown). The CPU 70 converts the output signal of the photo-electric converting element 64 into a digital value, and also, causes the converted data to be stored in the solid state memory element 71, and thus, the inputted image information is memorized and retained.

For outputted of the memorized image information, upon depression of the output operating key 60, with an external appliance (not shown) being connected to the output port 56, the image information successively read out from the solid state memory element 71 is transmitted to the external appliance through the output port 56. As the external appliance, a printer, CRT display, facsimile equipment or the like may be connected to the image input device M3 as in the previous embodiments described earlier.

Figure 9:
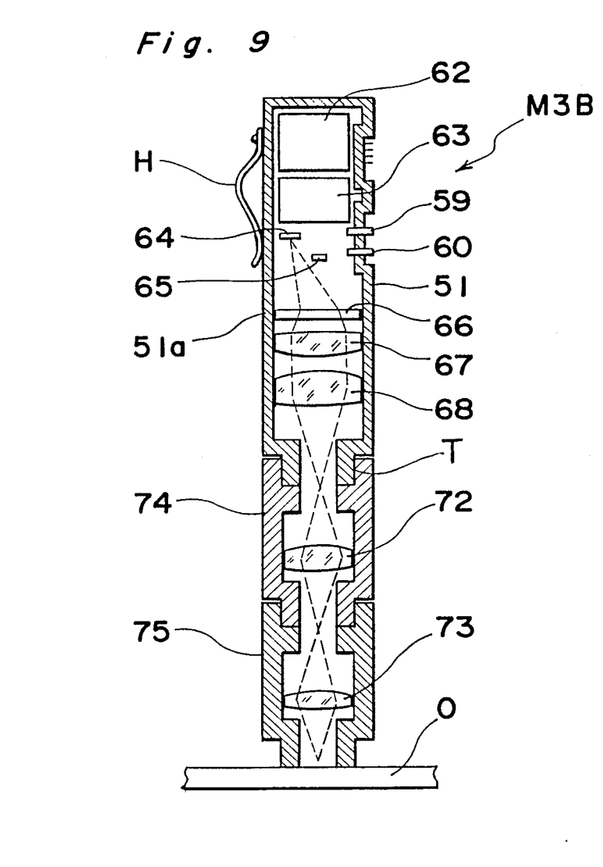
FIG. 9 is a view similar to FIG. 8, which particularly shows a embodiment of the present invention.

Referring also to FIG. 9, in a modification M3B of the image input device M3 for the third embodiment of FIG. 8, the forward end of the main body 51a for the casing 51 is formed into a reduced diameter portion T for constituting a completed casing for the image input device M3B by the main body 51a alone, with the second condenser lens 68 being also provided in the main body 51a for the purpose. However, in order to meet the requirement for variable magnifications, interchangeable or exchangeable first and second units 74 and 75 having condenser lenses 72 and 73 respectively are arranged to be detachably mounted onto the reduced diameter portion T in a state as shown. The condenser lenses 72 and 73 of the first and second units 74 and 75 and the second condenser lens 68 accommodated in the main body 51a respectively have different focal lengths, and various magnifications may be achieved according to combinations thereof. Needless to say, a first and second units 74 and 75 may be used in the state where only one of the units is mounted on the main body 51a.

In the third embodiment as shown in FIG. 8, although enlargement or contraction of the input image may be selected according to an exchange or a combination of the condenser lenses, variation in the brightness is accordingly anticipated. It is to be noted, however, that such a variation in the brightness with respect to the input image can be readily corrected in terms of a circuit arrangement, for treating the input signal by imparting an automatic gain control function or a function to control a slice level during conversion of a analog value of the light amount into a digital value.

As is clear from the foregoing description, in the third embodiment because only the image input device can be carried about for memorizing the image input when necessary, and also for outputting the image information as required, it is extremely convenient to use, while the input device can be made compact in size and light in weight. Moreover, the output of the device can be applied to various applications, since the external appliance is not limited to a specific one.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image input device of a portable type, comprising:
    a light source for emitting light onto an information medium;
    image forming optical means for collecting said light emitted by said light source when reflected from said information medium and directing said light reflected from said information medium;
    photo-electric converting means for developing an image signal representative of an image on said information medium as reflected by said light and directed by said image forming optical means;
    a memory function section having a solid state memory element for storing said image signal from said photo-electric converting means;
    an output port for removably connecting external devices with said memory function section; and
    operating keys for operating said image input device;
    said image forming optical means having a portion for receiving interchangeable lenses by removably attaching and detaching said lenses to said portion.

2. An image input device as claimed in claim 1, wherein said light source comprises a semiconductor laser.

3. An image input device as claimed in claim 1, wherein said photo-electric converting means comprises a CCD.

4. An image input device as claimed in claim 1, wherein said image forming optical means comprises at least one image forming lens for converging said light reflected from said information medium and a diffraction grating for directing said light.

5. An image input device as claimed in claim 1, wherein said memory function section comprises connecting means for removably attaching and detaching said exchangeable memory means with said photo-electric converging means.

6. An image input device of a portable type, comprising:
    a light source for emitting light onto an original document;
    photo-electric converting means for developing an electrical signal representative of an image on said original document as reflected by said light from said original document;
    exchangeable memory means for storing said electrical signal from said photo-electric converting means;
    an output port for removably connecting an external device with said exchangeable memory means; and
    operating keys for operating said image input device.

7. An image input device as claimed in claim 6, wherein said exchangeable memory means comprises a RAM, memory refresh means, a CPU, and a power source.

8. An image input device as claimed in claim 7, wherein said electrical signal is converted to a digital signal by said CPU and said digital signal is stored in said RAM.

9. An image input device as claimed in claim 6, wherein said exchangeable memory means comprises connecting means for attaching and detaching said exchangeable memory means with said photo-electric converting means.

10. An image input device of a portable type, comprising:
    a light source for emitting light towards an information medium;
    image forming optical means for converging said light onto said information medium and directing said light reflected from said information medium;
    photo-electric converting means for developing an image signal representative of an image on said information medium as reflected by said light from said image forming optical means;
    exchangeable memory means for storing said image signal from said photo-electric converting means;
    an output port for removably connecting external devices with said exchangeable memory means; and
    operating keys for operating said image input device.

11. An image input device as claimed in claim 10, wherein said image forming optical means comprises diffraction grating means and a lens.

12. An image input device as claimed in claim 10, wherein said light source comprises a semiconductor laser.

13. An image input device as claimed in claim 11, wherein said light source, said photo-electric converting means and said diffraction grating means are hermetically sealed in a unit.

14. An image input device as claimed in claim 13, wherein said unit further comprises connecting means for removably attaching and detaching said unit with said exchangeable means.

* * * * *